Patented Aug. 23, 1927.

1,639,903

UNITED STATES PATENT OFFICE.

WINFIELD SCOTT, OF AKRON, OHIO, ASSIGNOR TO THE RUBBER SERVICE LABORATORIES CO., OF AKRON, OHIO, A CORPORATION OF OHIO.

PROCESS OF ACCELERATING THE VULCANIZATION OF RUBBER.

No Drawing.  Application filed August 14, 1924.  Serial No. 731,969.

My present invention is directed to a method of vulcanizing rubber, and is more particularly directed to a process of materially shortening the vulcanization period, whereby a final vulcanized rubber product is obtained which possesses desirable and commercial qualities.

It has been known for some time that many simple condensation products of aldehydes and amines, that is, compounds known as Schiff's bases, possess properties that make them desirable substances to be used as accelerators of the vulcanization of rubber. All of the compounds of this type whose use as rubber accelerators has been disclosed up to the present time, have however, been prepared by the interaction of an aldehyde and an amine without the addition of any other substance which would affect or modify the character of the simple condensation product obtained by the reaction. I have now found that the well known Schiff's bases mentioned by Peachey (British Patent 7,370 of 1914) and by Cadwell (U. S. P. 1,417,970), as well as the aldehyde derivatives of the Schiff bases mentioned by North (U. S. Patent 1,467,984) may be so modified as to produce compounds of entirely different chemical constitution and I have furthermore found that I may use these modified Schiff's bases most advantageously as accelerators of the rubber vulcanization process.

The substances which comprise my preferred class of accelerators are then, modified Schiff's bases, and preferably are the aldehyde reaction products of such modified bases. Such compounds are most readily obtained by treating a Schiff's base, or a reaction mixture producing a Schiff's base, with an acid or other modifying ingredient, under the conditions that are hereinafter set forth. The modified or rearranged material, or preferably its aldehyde reaction product, is then used as an accelerating agent in the manufacture of a rubber compound.

When an aldehyde-amine reaction product of the type known as a Schiff's base is treated with an acid, a vigorous reaction ensues which is accompanied by the evolution of heat. In the case of the Schiff's base produced by the interaction of two molecules of aniline with one molecule of acetaldehyde, that is, ethylidene di-anilide, only a very small amount of acid, approximately 0.2% by weight of 30% hydrochloric acid is needed to bring about the complete inversion or modification of the compound although larger quantities of the acid may be used to hasten the rearrangement of the compound. This reaction may be carried out in the presence or absence of free amine or of an amine salt, such as aniline hydrochloride. Since a number of the di-anilido-aldehyde derivatives of aliphatic aldehydes, and particularly of those aldehydes containing more than one carbon atom, are relatively unstable, it is desirable to carry out the modification or rearrangement of the Schiff's base under such temperature conditions as will prevent any side reactions or decompositions from taking place. For this reason, it is desirable to maintain the temperature during the rearrangement of the interacting mixture within certain limits as is set forth in the following example.

A Schiff's base, for example, ethylidene di-anilide is prepared by allowing 279 parts of aniline to react with 45 parts of acetaldehyde. The aldehyde is added slowly to the amine with agitation while maintaining the temperature of the mixture below 40° centigrade although a higher temperature may be reached in this stage of the action without detrimentally affecting the product. After all the aldehyde has been added, the mixture is cooled to and carefully maintained at a temperature no higher than 30° centigrade, whereupon 5 parts by weight of 30% hydrochloric acid are slowly added with complete stirring. The mixture is allowed to stand for a period of several hours after which the acid is carefully and completely neutralized with a suitable alkali, such as caustic soda, soda ash or preferably calcium carbonate and the product washed to remove the salt. The product, consisting of equimolecular proportions of aniline and rearranged or inverted ethylidene di-anilide is treated with 135 parts by weight of acetaldehyde (or with approximately three molecular proportions of any other aldehyde) whereupon there is obtained the aldehyde reaction product of a modified or inverted Schiff's base, and it is this material, or an analogous substance which I prefer to use as an accelerator of the vulcanization of rubber.

The following example is illustrative of a typical test stock prepared by the use of one of my new type of accelerators. One hundred parts of rubber, for example the grade known as smoked sheet rubber; 5 parts of zinc oxide; 3.5 parts of sulfur; and one part of accelerator, are mixed together in the well known manner on the rubber mills. As an accelerator, I may use any of those falling within the class of aldehyde reaction products of a rearranged Schiff's base. The mixture is then vulcanized for the periods shown in the following table wherein the characteristic physical properties of the product vulcanized for the times indicated are given.

| Time of cure at 287 F. (40 lbs. steam pressure). | Modulus. | | | Tensile strength in lbs. per sq. in. | Elongation. |
|---|---|---|---|---|---|
| | 300%. | 500%. | 700%. | | |
| 15 minutes | 163 | 372 | 1,415 | 2,995 | 865% |
| 30 minutes | 212 | 627 | 2,445 | 3,970 | 805% |
| 45 minutes | 231 | 762 | 2,750 | 4,340 | 800% |
| 60 minutes | 258 | 752 | 2,860 | 4,025 | 770% |

These results indicate that the optimum cure is realized after approximately 45 minutes heating at a temperature of 287° Fahrenheit (40 pounds steam pressure per sq. in.). My preferred class of compounds may also be compounded into a composition intended for a tire tread stock. Thus, for example, I may mix in the well known manner, a compound comprising 31 parts smoked sheet rubber, 20 parts #1 amber crepe rubber, 17.5 parts of carbon black, 22 parts zinc oxide, 1.25 parts of cycline oil, (a blended mineral and vegetable oil), 2 parts of hardwood pitch, 3 parts of mineral rubber, 2 parts of sulfur, and 1.25 parts of one of my new type of accelerators. The compound is then heated at about 287° F. (40 pounds steam pressure per sq. in.) for a period of 30 to 60 minutes, whereupon a vulcanized product is obtained which possesses commercial qualities.

Accelerators produced by the aldehyde reaction of rearranged Schiff's bases function equally well in hard rubber as in soft rubber stocks. The following is illustrative of a hard rubber that may be produced by the use of my new type of accelerators. Twenty parts (20) of thin brown crepe rubber, 20 parts of smoked sheet rubber, 10 parts of lime, 15 parts of zinc oxide, 10 parts of mineral rubber, 20 parts of sulfur, and 1.25 parts of one of my new type of accelerators, for example the acetaldehyde reaction product of rearranged ethylidene di-anilide, are mixed in the usual manner, and vulcanized at 287° F. (40 pounds of steam pressure per square inch) for approximately one hour and 45 minutes. A high quality hard rubber is thereby produced.

Although I have set forth but one example of preparing my new type of accelerators, other means, as well as the use of different proportions of interacting substances than are disclosed in the preceding examples are possible and may be employed. Thus, I have prepared Schiff's bases or derivatives thereof, by reacting equal molecular proportions of the amine and aldehyde; by reacting two molecules of amine to one molecule of aldehyde; also by reacting three molecules of amine to one molecule of aldehyde and two molecules of amine to three molecules of aldehyde. All of these various products have been modified or rearranged in the manner already described by treatment with acid and then reacted further with from one to four molecules of an aldehyde.

By way of example of another compound wherein different proportions of ingredients are combined than were used in the other examples already given, a Schiff's base is prepared by reacting 186 parts of aniline with 45 parts of acetaldehyde under such controlled temperature conditions that the mixture is maintained at approximately not more than 10° centigrade above room temperature. The mixture is allowed to stand for about two hours whereupon 6 parts of 30% hydrochloric acid is slowly added while maintaining the temperature of the mixture below 30° centigrade by the use of cooling means if necessary. After standing for several hours, the acid is neutralized with the calculated quantity of a 10% solution of an alkali and the mixture stirred for some time to ensure complete reaction. Thereupon 90 parts by weight of acetaldehyde are added to the mixture and the temperature allowed to rise to as much as 75° centigrade, if desired. After all the aldehyde has been added, the mixture is allowed to stand for an hour or more and the mixture is then dried preferably in a vacuum at about 90° centigrade until the product contains a relatively small amount (approximately 0.5%) of moisture. The product, which as in the first example hereinbefore given, I prefer to term the acetaldehyde reaction product of rearranged ethylidene di-anilide, is now ready for incorporation into a rubber mix.

One hundred parts of smoked sheet rubber, 5 parts of zinc oxide, 3.5 parts of sulfur and 1 part of accelerator prepared as just described, are mixed together and cured to produce a compound possessing the physical characteristics as indicated in the following table:

| Time of cure at 287° F. (40 lbs. steam pressure). | Modulus. | | | Tensile strength lbs./sq.in. | Elongation. |
|---|---|---|---|---|---|
| | 300%. | 500%. | 700%. | | |
| 15 minutes | 190 | 391 | 1270 | 3045 | 880% |
| 30 minutes | 222 | 469 | 1777 | 3530 | 820% |
| 45 minutes | 254 | 581 | 2060 | 3880 | 825% |
| 60 minutes | 271 | 587 | 2150 | 3750 | 815% |

As are indicated by the results, the optimum cure with the above stock is realized after about 45 minutes heating under a steam pressure of 40 pounds per square inch.

As a further example of the various combinations of ingredients which are possible to be used in the preparation of my new type of accelerators, the following is given. The aldehyde derivative of a Schiff's base is prepared according to the disclosure in United States Patent 1,467,984 to North whereby three molecular proportions of aldehyde are combined with two molecular proportions of an aromatic primary amine. This product is then modified according to my preferred process by the use of a small quantity of dilute sulfuric or other acid, the acid neutralized, and the resulting product treated with formaldehyde and finally dried. This final product is then ready for incorporation into a rubber mix and produces a vulcanized rubber possessing characteristic and very desirable qualities. For example, when incorporated into rubber in the proportion of 0.5 parts of accelerator with 100 parts of rubber, 3.5 parts of sulfur and 5 parts of zinc oxide and the mixture vulcanized at 40 pounds steam pressure per square inch for a period of 45 minutes, a product having a tensile strength of approximately 3500 pounds per square inch and an ultimate elongation of about 800% is obtained.

It is apparent that as a Schiff's base serving as the initial starting point for the preparation of my compounds, I may use any material known by that term and which is fully described by Schiff in Annalen der Chemie und Pharmacie, 1864–1865, pp. 344 et seq. Preferably I choose to employ those Schiff bases obtained by the reaction of a primary aromatic amine such as aniline, the toluidines, the xylidenes, the naphthylamines and the like with aliphatic aldehydes such as formaldehyde, acetaldehyde, propionaldehyde or with unsaturated aldehydes such as acrolein or croton-aldehyde and the like. It is not necessary that I use the same aldehyde in reacting with the rearranged base as was used in preparing the Schiff's base. Thus, for example, the rearranged ethylidene di-anilide or other analogous compounds may be reacted with formaldehyde or with acrolein or with any other aldehyde as well as with other compounds reacting with primary amino groups, for example with carbon disulfid and a product having excellent rubber vulcanization acceleration properties results.

Inasmuch as my new accelerators are the products analogous to those obtained by carrying out the so-called benzidene transformation on a Schiff's base and then reacting this product with an aldehyde, it is, of course, possible to prepare these materials in the presence of a solvent. Thus, in the first example hereinbefore described, an excess of aniline was used to provide the solvent. I may also prepare these materials in the presence of other solvents such as benzol and use other agents than hydrochloric acid as an inverting agent. I have, for example obtained excellent results by using sulfuric acid in place of the hydrochloric acid described. Furthermore, I have obtained very desirable products by the use of these alternative ingredients.

Although I have set forth to a certain extent my theory as to the chemical changes taking place in the series of reactions involved in the production of my new types of compounds and have described several examples whereby such compounds may be prepared and used as rubber vulcanization accelerators, it is to be understood that my invention is not dependent upon the accuracy of the theories which I simply use as an explanatory means for describing my new compounds nor is my invention limited to the examples given but is limited solely by the claims hereinafter given as a part of this specification and wherein I intend to claim all novelty inherent in my invention that is permissible in view of the prior art.

What I claim is:

1. The process of manufacturing an accelerator for use in the vulcanization of rubber which comprises treating an aldehyde derivative of Schiff's base with an acid, neutralizing said acid, and reacting the product so formed with an aldehyde.

2. The process of manufacturing an accelerator for use in the vulcanization of rubber which comprises treating an aldehyde derivative of Schiff's base formed by the combination of three molecular proportions of acetaldehyde and two molecular proportions of aniline, with acid, neutralizing said acid and reacting the product so formed with an aldehyde.

3. The process of manufacturing vulcanized rubber which comprises heating rubber and a vulcanizing agent in the presence of a small proportion of the product obtained by reacting an aldehyde with an amine, treating the reaction product so formed with a small amount of an acid, neutralizing said acid, and reacting said acid treated material with an additional quantity of an aldehyde.

4. The process of manufacturing vulcanized rubber which comprises heating rubber and a vulcanizing agent in the presence of a small proportion of the product obtained by reacting an aliphatic aldehyde with an aromatic primary amine, treating the reaction product so formed with a small amount of an acid, neutralizing said acid, and reacting said acid treated material with an additional quantity of an aliphatic aldehyde.

5. The process of manufacturing vulcanized rubber which comprises heating rubber and a vulcanizing agent in the presence of a small proportion of the product obtained by reacting from one to three molecular proportions of an aliphatic aldehyde with from one to three molecular proportions of an aromatic primary amine, treating the reaction product so formed with a small amount of an acid, neutralizing said acid, and reacting said acid treated material with an additional quantity of an aliphatic aldehyde.

6. The process of manufacturing vulcanized rubber which comprises heating rubber and a vulcanizing agent in the presence of a small proportion of the product obtained by reacting from one to three molecular proportions of acetaldehyde with from one to three molecular proportions of aniline, treating the reaction product so formed with a small amount of a mineral acid, neutralizing said acid, and reacting said acid treated material with an additional quantity of an aliphatic aldehyde.

7. The process of manufacturing vulcanized rubber which comprises heating rubber and a vulcanizing agent in the presence of a small proportion of the product obtained by reacting three molecular proportions of acetaldehyde with two molecular proportions of aniline, treating the reaction product so formed with a small amount of hydrochloric acid, neutralizing said acid, and reacting said acid treated material with formaldehyde.

8. A composition of matter comprising the vulcanization product of a mixture of rubber with a vulcanizing agent and a vulcanization accelerator, said accelerator comprising the product obtained by reacting an aldehyde with an amine, treating the reaction product so formed with a small amount of an acid, neutralizing said acid, and reacting said acid treated material with an additional quantity of an aldehyde.

9. A composition of matter comprising the vulcanization product of a mixture of rubber with a vulcanizing agent and a vulcanization accelerator, said accelerator comprising the product obtained by reacting an aliphatic aldehyde with an aromatic primary amine, treating the reaction product so formed with a small amount of an acid, neutralizing said acid, and reacting said acid treated material with an additional quantity of an aliphatic aldehyde.

10. A composition of matter comprising the vulcanization product of a mixture of rubber with a vulcanizing agent and a vulcanization accelerator, said accelerator comprising the product obtained by reacting from one to three molecular proportions of an aliphatic aldehyde with from one to three molecular proportions of an aromatic primary amine, treating the reaction product so formed with a small amount of an acid, neutralizing said acid, and reacting said acid treated material with an additional quantity of an aliphatic aldehyde.

11. A composition of matter comprising the vulcanization product of a mixture of rubber with a vulcanizing agent and a vulcanization accelerator, said accelerator comprising the product obtained by reacting from one to three molecular proportions of acetaldehyde with from one to three molecular proportions of aniline, treating the reaction product so formed with a small amount of a mineral acid, neutralizing said acid, and reacting said acid treated material with an additional quantity of an aliphatic aldehyde.

12. A composition of matter comprising the vulcanization product of a mixture of rubber with a vulcanizing agent and a vulcanization accelerator, said accelerator comprising the product obtained by reacting three molecular proportions of acetaldehyde with two molecular proportions of aniline, treating the reaction product so formed with a small amount of hydrochloric acid, neutralizing said acid, and reacting said acid treated material with formaldehyde.

13. The process of manufacturing an accelerator for use in the vulcanization of rubber which comprises treating an aldehyde derivative of a Schiff's base formed by the reaction of substantially two molecular proportions of a primary aromatic amine and three molecular proportions of an aliphatic aldehyde, with an acid, neutralizing said acid, and reacting the product so formed with an aliphatic aldehyde.

14. The process of manufacturing an accelerator for use in the vulcanization of rubber which comprises treating an aldehyde derivative of a Schiff's base formed by the reaction of substantially two molecular proportions of a primary aromatic amine and three molecular proportions of an aliphatic aldehyde, with hydrochloric acid, neutralizing said acid, and reacting the product so formed with formaldehyde.

15. The process of manufacturing an accelerator for use in the vulcanization of rubber which comprises treating an aldehyde derivative of a Schiff's base formed by the reaction of substantially two molecular proportions of a primary aromatic amine and three molecular proportions of an aliphatic aldehyde with approximately 2% by weight of 30% hydrochloric acid, neutralizing said acid, and reacting the product so formed with formaldehyde.

16. The process of manufacturing an accelerator for use in the vulcanization of rubber which comprises treating an aldehyde derivative of a Schiff's base formed by the combination of substantially three molecular proportions of acetaldehyde and two molecular proportions of aniline, with hydrochloric acid, neutralizing said acid, and reacting the product so formed with an aldehyde.

17. The process of manufacturing an accelerator for use in the vulcanization of rubber which comprises treating an aldehyde derivative of a Schiff's base formed by the combination of substantially three molecular porportions of acetaldehyde and two molecular proportions of aniline, with approximately 2% by weight of hydrochloric acid, neutralizing said acid, and reacting the product so formed with formaldehyde.

18. The process of manufacturing an accelerator for use in the vulcanization of rubber which comprises reacting an aliphatic aldehyde with an aromatic primary amine, treating the product so formed with a small amount of an acid, neutralizing said acid, and reacting said acid-treated material with an additional quantity of an aliphatic aldehyde.

19. The process of manufacturing an accelerator for use in the vulcanization of rubber which comprises reacting from 1 to 3 molecular proportions of an aliphatic aldehyde with from 1 to 3 molecular proportions of an aromatic primary amine, treating the reaction product so formed with a small amount of an acid, neutralizing said acid, and reacting said acid treated material with an additional quantity of an aliphatic aldehyde.

In testimony whereof I affix my signature.

WINFIELD SCOTT.